US010098145B2

(12) United States Patent
Yun et al.

(10) Patent No.: US 10,098,145 B2
(45) Date of Patent: Oct. 9, 2018

(54) METHOD AND DEVICE FOR TRANSMITTING AND RECEIVING TRAFFIC STREAM IN WIRELESS LAN SYSTEM

(71) Applicants: Seoul National University of Technology Center for Industry Collaboration, Seoul (KR); LG ELECTRONICS INC., Seoul (KR)

(72) Inventors: Jihoon Yun, Seoul (KR); Sanghyun Kim, Seoul (KR); Suhwook Kim, Seoul (KR)

(73) Assignees: LG ELECTRONICS INC., Seoul (KR); SEOUL NATIONAL UNIVERSITY OF TECHNOLOGY CENTER FOR INDUSTRY COLLABORATION, Seoul (KR)

( * ) Notice: Subject to any disclaimer, the term of this patent is extended or adjusted under 35 U.S.C. 154(b) by 194 days.

(21) Appl. No.: 15/259,756

(22) Filed: Sep. 8, 2016

(65) Prior Publication Data
US 2017/0290050 A1    Oct. 5, 2017

Related U.S. Application Data

(60) Provisional application No. 62/314,944, filed on Mar. 29, 2016.

(51) Int. Cl.
| *H04W 4/00* | (2018.01) |
| *H04W 74/00* | (2009.01) |
| *H04W 48/10* | (2009.01) |
| *H04W 74/02* | (2009.01) |
| *H04W 84/12* | (2009.01) |
| *H04W 48/12* | (2009.01) |

(52) U.S. Cl.
CPC .......... *H04W 74/002* (2013.01); *H04W 48/10* (2013.01); *H04W 48/12* (2013.01); *H04W 74/02* (2013.01); *H04W 84/12* (2013.01)

(58) Field of Classification Search
CPC ... H04W 74/002; H04W 48/10; H04W 48/12; H04W 74/02; H04W 84/12
USPC ........................................................ 370/328
See application file for complete search history.

(56) References Cited

U.S. PATENT DOCUMENTS

| 2006/0239292 A1* | 10/2006 | Kahana | ................ | H04W 74/02 370/437 |
| 2008/0137684 A1* | 6/2008 | Huang | ................ | H04W 28/26 370/447 |
| 2010/0158494 A1* | 6/2010 | King | ..................... | G03B 17/00 396/56 |

* cited by examiner

*Primary Examiner* — Sai Ming Chan
(74) *Attorney, Agent, or Firm* — Birch, Stewart, Kolasch & Birch, LLP

(57) ABSTRACT

Provided are a method and a device for transmitting and receiving a traffic stream in a wireless local area network (WLAN) system. Specifically, the device broadcasts a beacon frame including allocation information on a contention-free period (CFP) and allocation information on a contention period (CP) to a station (STA) and transmits a downlink traffic stream to the STA or receives an uplink traffic stream from the STA, based on the allocation information on the CFP. The allocation information on the CFP indicates that the downlink traffic stream is transmitted without performing a clear channel assessment (CCA) during the CFP and indicates that the uplink traffic stream is received with performing a CCA during the CFP.

14 Claims, 18 Drawing Sheets

FIG. 2

PPDU Format (IEEE 802.11a/g): L-LTF | L-STF | L-SIG | Data

HT PPDU Format (IEEE 802.11n): L-LTF | L-STF | L-SIG | SIG A | HT-SFT | HT-LFT | ... | HT-LFT | Data VHT PPDU Format (IEEE 802.11ac): L-LTF | L-STF | L-SIG | VHT-SIG A | VHT-SFT | VHT-LFT | VHT-SIG B | Data (UL Tput decrease by 0.49%)

METHOD AND DEVICE FOR TRANSMITTING AND RECEIVING TRAFFIC STREAM IN WIRELESS LAN SYSTEM

CROSS-REFERENCE TO RELATED APPLICATIONS

This application claims the benefit of priority of U.S. Provisional application 62/314,944 filed on Mar. 29, 2016, all of which is incorporated by reference in its entirety herein.

BACKGROUND OF THE INVENTION

Field of the Invention

The present specification relates to wireless communications, and more particularly, to a method for transmitting and receiving a traffic stream in a wireless local area network (WLAN) system, and a device using the same.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

An aspect of the present specification is to provide a method for transmitting and receiving a traffic stream in a wireless local area network (WLAN) system, and a device using the same.

The present specification proposes a method for transmitting and receiving a traffic stream in a WLAN system.

First, defining terms, a contention-free period may be represented by a CFP, and a contention period may be represented by a CP. Further, an overlapping basic service set (OBSS) environment may correspond to an environment in which a first basic service set (BSS) overlaps with a second BSS. An access point (AP) and a station (STA) may be included in the second BSS. That is, the following description is made on operations of the AP and the STA that are included in the second BSS. The first BSS and the second BSS share a service interval including a CFP and a CP. A traffic stream may correspond to a Quality of Service (QoS) traffic stream.

The AP broadcasts a beacon frame including allocation information on a CFP and allocation information on a CP to an STA.

Based on the allocation information on the CFP, the AP transmits a downlink traffic stream to the STA or receives an uplink traffic stream from the STA.

For example, the allocation information on the CFP indicates that the downlink traffic stream is transmitted without performing a clear channel assessment (CCA) during the CFP. Further, the allocation information on the CFP indicates that the uplink traffic stream is received with performing a CCA during the CFP. That is, the allocation information on the CFP shows that when an unoccupied interval occurs in the CFP, the uplink traffic stream occupies the unoccupied interval period which is not occupied by the downlink traffic stream in the CFP. To this end, the allocation information on the CFP includes information on a traffic group that is allowed to occupy the unoccupied interval of the CFP and an access parameter (AIFSN, CWmin, CWmax, and TXOP) to be used for the unoccupied interval of the CFP. Here, the uplink traffic stream is received in the unoccupied interval of the CFP using the access parameter information. Since the uplink traffic stream occupies the unoccupied interval of the CFP based on EDCA, CCA is involved even in the CFP.

For example, the allocation information on the CP indicates that a downlink traffic stream is transmitted with performing a CCA during the CP. The AP transmits the downlink traffic stream to the STA based on the allocation information on the CP. That is, the allocation information on the CP shows that when there is too much downlink traffic and thus all downlink traffic streams are not transmitted within the CFP, excessive downlink traffic streams are transmitted even in the CP. To this end, the allocation information on the CP includes information on a traffic group that is allowed to occupy the CP and an access parameter (AIFSN, CWmin, CWmax, and TXOP) to be used for the CP. Here, the excessive downlink traffic streams are transmitted during the CP using the access parameter information. Since the excessive downlink traffic streams occupy the CP using a lower-ranking EDCA parameter for impartiality with traffic in the CP, CCA is involved.

For another example, when the CFP includes a first interval and a second interval, the allocation information on the CFP indicates that the downlink traffic stream is transmitted without performing a CCA during the first interval. Further, when the CFP includes the first interval and the second interval, the allocation information on the CFP indicates that the downlink traffic stream is transmitted with performing a CCA during the second interval. That is, the allocation information on the CFP shows an operation of transmitting a downlink traffic stream when transmission intervals of a traffic stream of the first BSS and a traffic stream of the second BSS overlap during the CFP.

Since the AP and the STA are included in the second BSS, the first interval may correspond to an interval in which only the second BSS transmits a traffic stream in the CFP, and the second interval may correspond to an interval in which the first BSS and the second BSS transmit traffic streams in an overlapping manner within the CFP. Thus, the AP transmits the downlink traffic stream to the STA during the first interval. Here, since the first interval is occupied only by the second BSS, the AP does not perform CCA when transmitting the downlink traffic stream in the first interval. Further, the AP transmits the downlink traffic stream to the STA during the second interval. Here, since the second interval is occupied by the first BSS and the second BSS in an overlapping manner, the AP performs CCS when transmitting the downlink stream in the second interval. That is, since the second interval is a period in which the first BSS and the second BSS transmit traffic streams in an overlapping manner, medium access is performed.

The allocation information on the CFP includes at least one of the start point and the end point of the CFP, the duration of the CFP, a CFP repetition number, and information on a traffic group to occupy the CFP. The start point and the end point of the CFP are set to offset values from the start point of a service interval. The information on the traffic group to occupy the CFP may include at least one of information on the second BSS, a transmission direction (uplink or downlink) of a traffic stream, an STA identifier (ID), a traffic stream ID, and an access category.

The allocation information on the CP includes at least one of the start point and the end point of the CP, the duration of the CP, a CP repetition number, and information on a traffic group to occupy the CP. The start point and the end point of the CP are set to offset values from the start point of a service interval. The information on the traffic group to occupy the CP may include at least one of information on the second BSS, a transmission direction (uplink or downlink) of a traffic stream, an STA ID, a traffic stream ID, and an access category.

Further, the present specification proposes a device for transmitting and receiving a traffic stream in a WLAN system. The device may correspond to an AP, without being limited thereto.

First, defining terms, a contention-free period may be represented by a CFP, and a contention period may be represented by a CP. Further, an overlapping BSS environment may correspond to an environment in which a first BSS overlaps with a second BSS. An AP and a STA may be included in the second BSS. That is, the following description is made on operations of the AP and the STA that are included in the second BSS. The first BSS and the second BSS share a service interval including a CFP and a CP. A traffic stream may correspond to a QoS traffic stream.

The device may include a radio frequency (RF) unit to transmit and receive a radio signal and a processor operatively connected to the RF unit.

The processor broadcasts a beacon frame including allocation information on a CFP and allocation information on a CP to an STA.

Based on the allocation information on the CFP, the processor transmits a downlink traffic stream to the STA or receives an uplink traffic stream from the STA.

For example, the allocation information on the CFP indicates that the downlink traffic stream is transmitted without performing a CCA during the CFP. Further, the allocation information on the CFP indicates that the uplink traffic stream is received with performing a CCA during the CFP. That is, the allocation information on the CFP shows that when an unoccupied interval occurs in the CFP, the uplink traffic stream occupies the unoccupied interval period which is not occupied by the downlink traffic stream in the CFP. To this end, the allocation information on the CFP includes information on a traffic group that is allowed to occupy the unoccupied interval of the CFP and an access parameter (AIFSN, CWmin, CWmax, and TXOP) to be used for the unoccupied interval of the CFP. Here, the uplink traffic stream is received in the unoccupied interval of the CFP using the access parameter information. Since the uplink traffic stream occupies the unoccupied interval of the CFP based on EDCA, CCA is involved even in the CFP.

For example, the allocation information on the CP indicates that a downlink traffic stream is transmitted with performing a CCA during the CP. The AP transmits the downlink traffic stream to the STA based on the allocation information on the CP. That is, the allocation information on the CP shows that when there is too much downlink traffic and thus all downlink traffic streams are not transmitted within the CFP, excessive downlink traffic streams are transmitted even in the CP. To this end, the allocation information on the CP includes information on a traffic group that is allowed to occupy the CP and an access parameter (AIFSN, CWmin, CWmax, and TXOP) to be used for the CP. Here, the excessive downlink traffic streams are transmitted during the CP using the access parameter information. Since the excessive downlink traffic streams occupy the CP using a lower-ranking EDCA parameter for impartiality with traffic in the CP, CCA is involved.

For another example, when the CFP includes a first interval and a second interval, the allocation information on the CFP indicates that the downlink traffic stream is transmitted without performing a CCA during the first interval. Further, when the CFP includes the first interval and the second interval, the allocation information on the CFP indicates that the downlink traffic stream is transmitted with performing a CCA during the second interval. That is, the allocation information on the CFP shows an operation of transmitting a downlink traffic stream when transmission intervals of a traffic stream of the first BSS and a traffic stream of the second BSS overlap during the CFP.

Since the AP and the STA are included in the second BSS, the first interval may correspond to an interval in which only the second BSS transmits a traffic stream in the CFP, and the second interval may correspond to an interval in which the first BSS and the second BSS transmit traffic streams in an overlapping manner within the CFP. Thus, the AP transmits the downlink traffic stream to the STA during the first interval. Here, since the first interval is occupied only by the second BSS, the AP does not perform CCA when transmitting the downlink traffic stream in the first interval. Further, the AP transmits the downlink traffic stream to the STA during the second interval. Here, since the second interval is occupied by the first BSS and the second BSS in an overlapping manner, the AP performs CCS when transmitting the downlink stream in the second interval. That is, since the second interval is a period in which the first BSS and the second BSS transmit traffic streams in an overlapping manner, medium access is performed.

The allocation information on the CFP includes at least one of the start point and the end point of the CFP, the duration of the CFP, a CFP repetition number, and information on a traffic group to occupy the CFP. The start point and the end point of the CFP are set to offset values from the start point of a service interval. The information on the traffic group to occupy the CFP may include at least one of information on the second BSS, a transmission direction (uplink or downlink) of a traffic stream, an STA identifier (ID), a traffic stream ID, and an access category.

The allocation information on the CP includes at least one of the start point and the end point of the CP, the duration of the CP, a CP repetition number, and information on a traffic group to occupy the CP. The start point and the end point of the CP are set to offset values from the start point of a service interval. The information on the traffic group to occupy the CP may include at least one of information on the second BSS, a transmission direction (uplink or downlink) of a traffic stream, an STA ID, a traffic stream ID, and an access category.

Coordination between BSSs may be used for transmission of QoS traffic having a great change in data traffic, such as a video, in a high-density WLAN BSS environment, thereby performing efficient communication.

BRIEF DESCRIPTION OF THE DRAWINGS

FIG. 2 is a diagram illustrating an example of a PPDU used in an IEEE standard.

DESCRIPTION OF EXEMPLARY EMBODIMENTS

Figure 1:
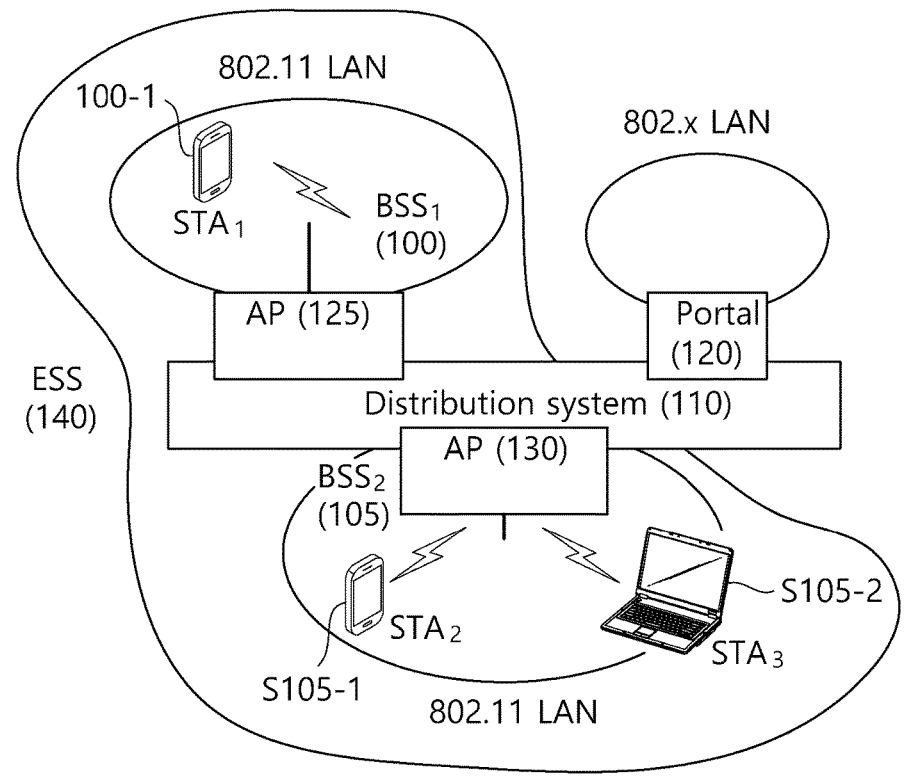
FIG. 1 is a conceptual view illustrating the structure of a wireless local area network (WLAN).
Figure 1:
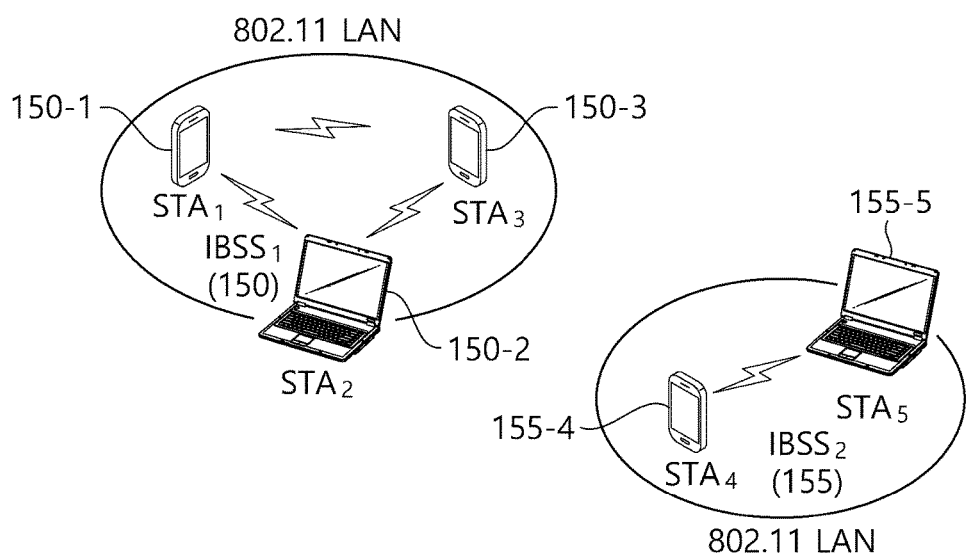

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-ISG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
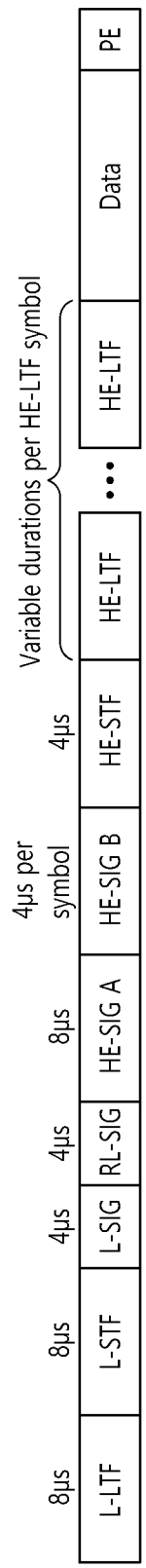
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 6 μm).

More detailed description of the respective fields of FIG. 3 will be made below.

Figure 4:
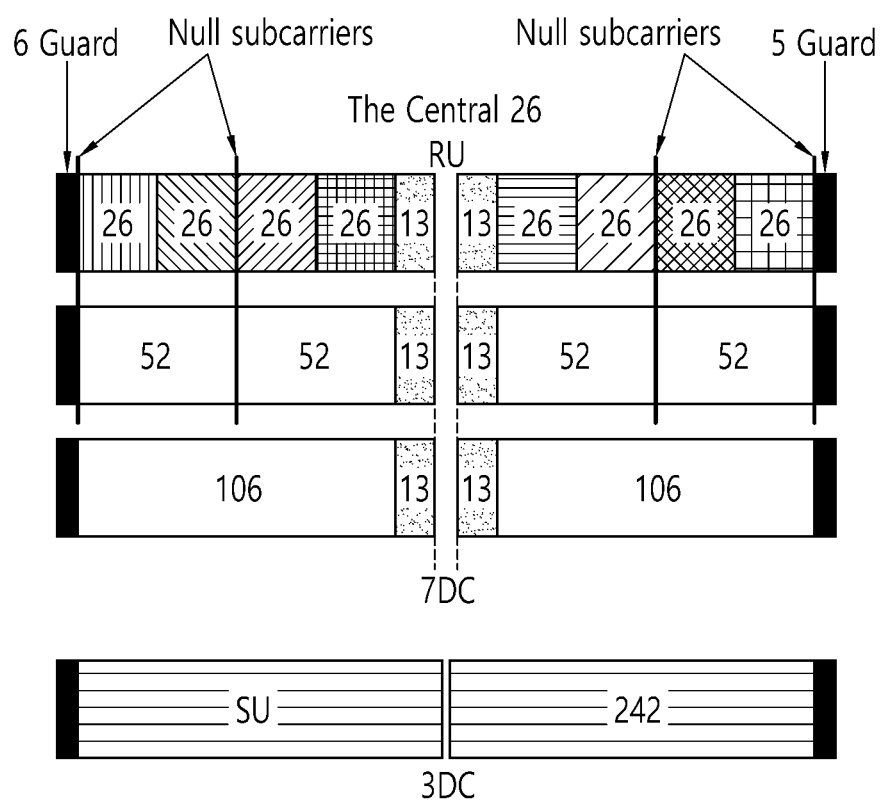
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the H3-STF, the HE-LTF, and the data field.

As illustrated in an uppermost part of FIG. 4, 26 units (that is, units corresponding to 26 tones). 6 tones may be used as a guard band in a leftmost band of the 200 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
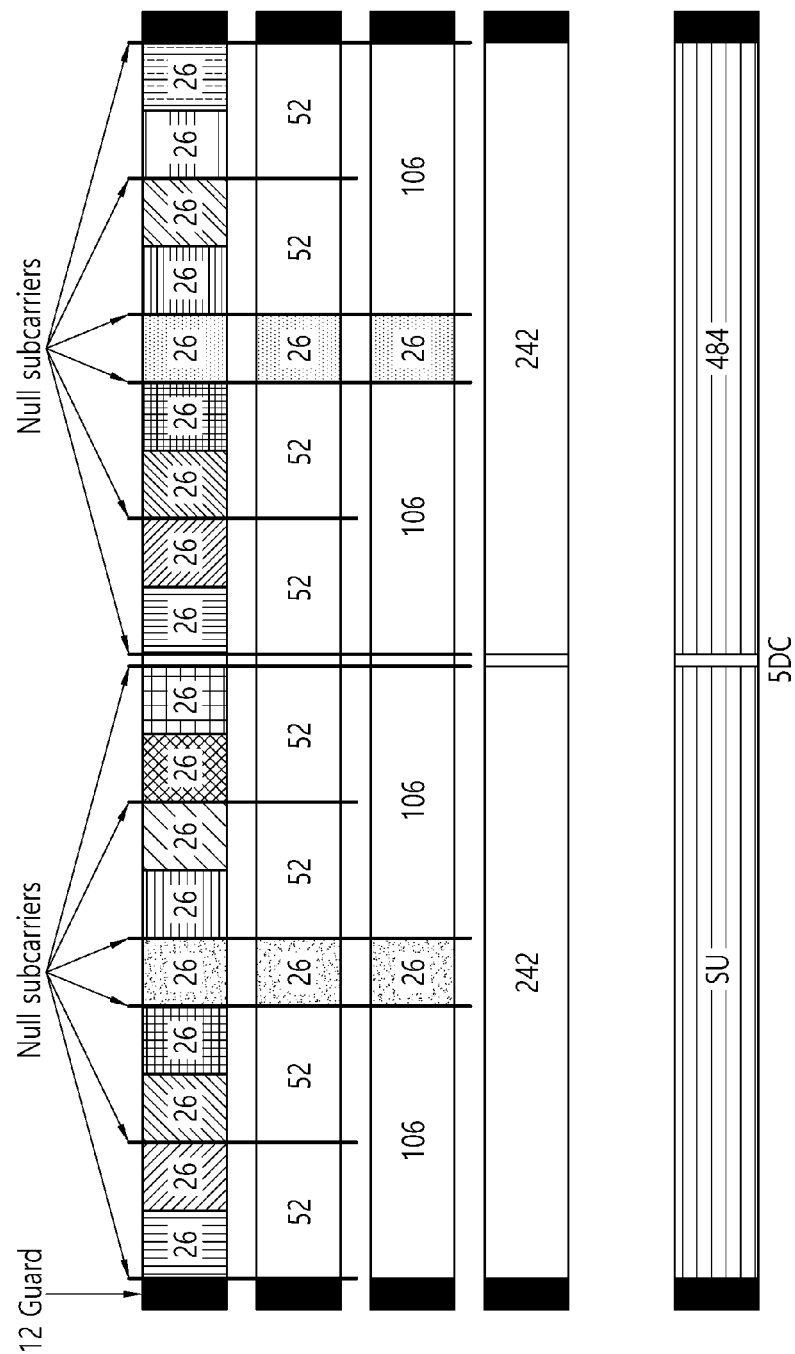
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
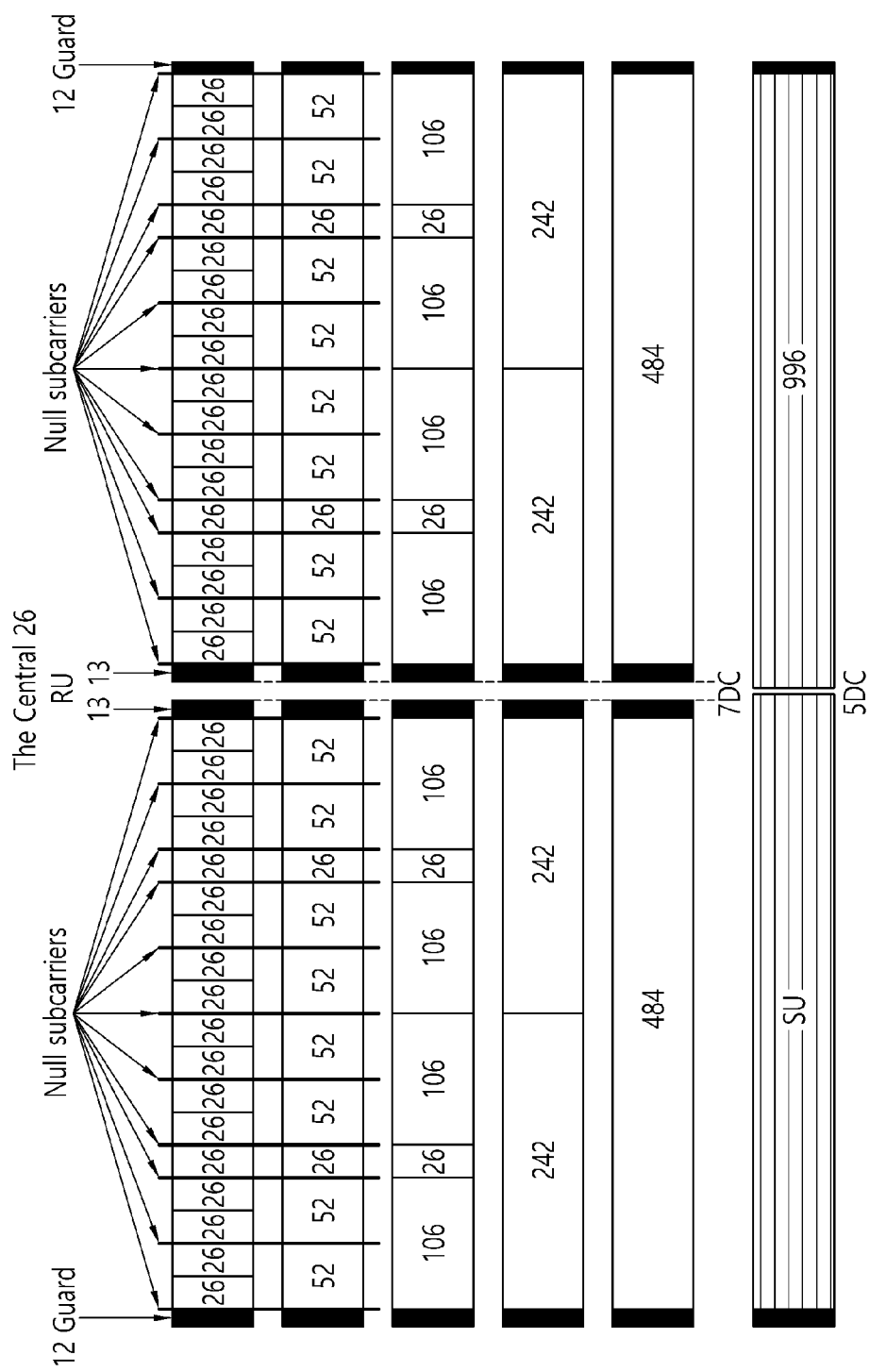
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted.

Meanwhile, the detailed number of RUs may be modified similarly to one example of each of FIG. 4 or 5.

Figure 7:
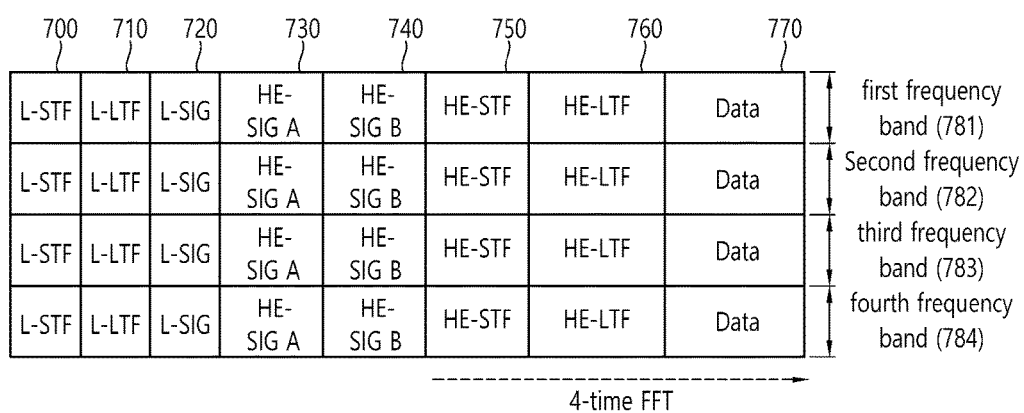
FIG. 7 is a diagram illustrating another example of the HE PDDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a format (for example, may be referred to as R-LSIG) may be configured, in which the L-SIG 720 is repeated.

An HE-SIG-A 730 may include the control information common to the receiving station.

In detail, the HE-SIG-A 730 may include information on 1) a DL/UL indicator, 2) a BSS color field of the BSS, 3) a field indicating a remaining time of a current TXOP period, 4) a field indicating an MCS technique applied to the HE-SIG-B, 5) an indication field regarding whether the HE-SIG-B is modulated by a dual subcarrier modulation technique for MCS, 6) a field indicating the number of symbols used for the HE-SIG-B, 7) a field indicating whether the HE-SIG-B is generated in a full band, 8) a field indicating the number of symbols of the HE-LTF, 9) a field indicating the length of the HE-LTF and a CP length, 10) a field indicating whether an OFDM symbol is present for LDPC coding, 11) a field indicating control information regarding packet extension (PE), 12) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
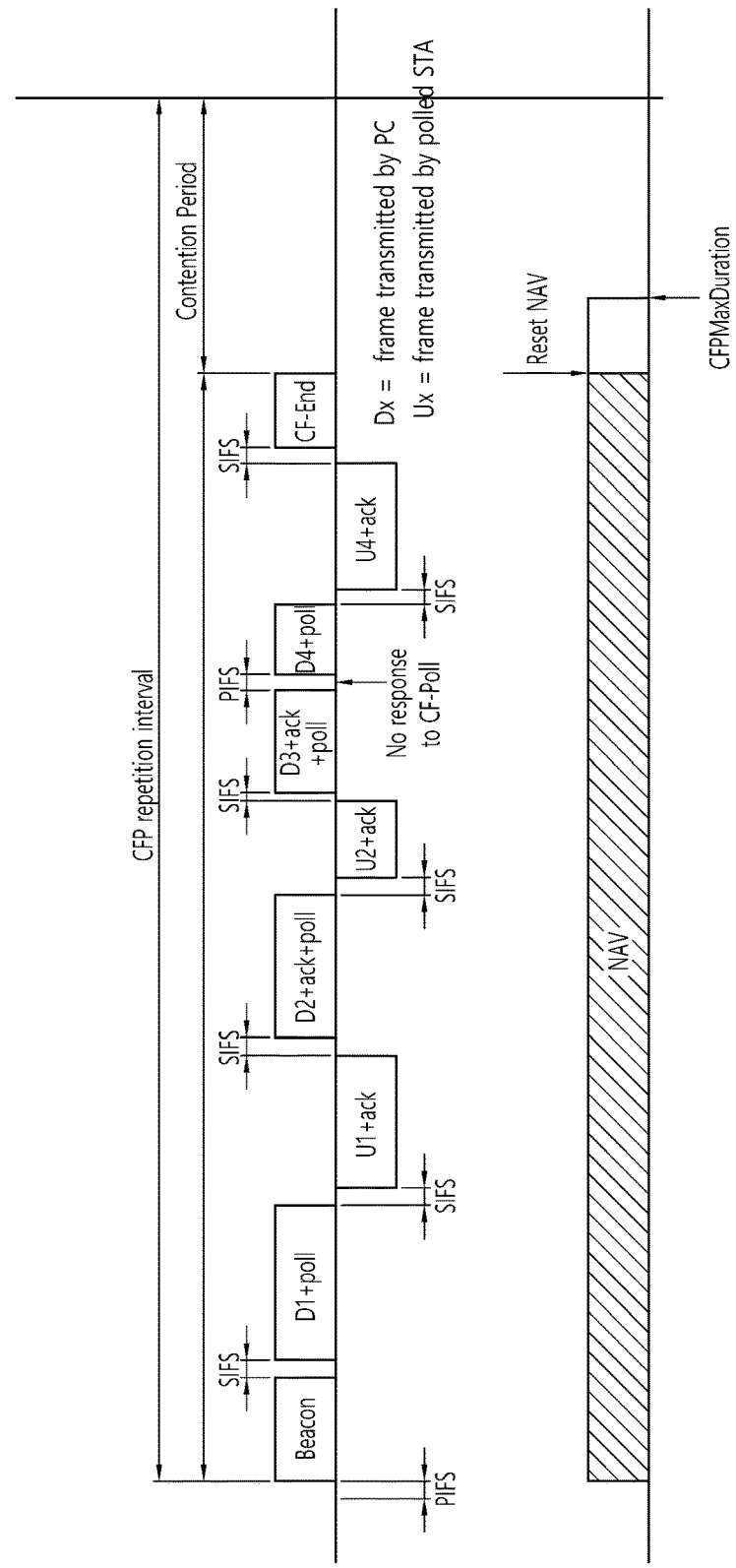
FIG. 8 shows operations of an AP and an STA in a CFP.

FIG. 8 shows operations of an AP and an STA in a CFP.

FIG. 8 illustrates data transmission in a CFP. A contention-free transmission protocol is based on a polling scheme that is controlled by a point coordinator (PC). The PC has capability to control a shared medium from the start point of the CFP, and the AP includes a function of the PC.

First, the AP transmits a beacon frame after a PCF inter-frame space (PIFS), and accordingly the CFP by a PCF starts. The duration of the CFP is defined in the beacon frame. Further, the duration of the CFP with the available maximum length is defined as a management information base (MIB) value, CFPMaxDuration, which generally has a length 2.5 times longer than a beacon interval.

A frame interval that is equivalent to the PIFS is needed to first access a medium using the PCF, and all other frame intervals are a short inter-frame space (SIFS), as illustrated in FIG. 8.

The duration of the CFP may end when the MIB value set in the beacon expires, and also ends when the PC transmits a CF-END frame. In the PCF, an STA that has received a poll from the PC has a right to send data.

Describing an operation with reference to FIG. 8, first, the AP sends a delivery traffic indication map (DTIM) beacon frame, which is sent to all STAs in a network, when a DTIM count is 0, thereby indicating the start of the CFP by the PCF. Here, the beacon frame includes information on the duration of the CFP.

The AP constructs a list of STAs capable of receiving a poll from the PC. The AP sequentially polls the STAs on the list during the CFP to allow the STAs on the list to send data without contention for a channel. An STA having received the poll from the AP sends one data frame, and the AP having received this data frame transmits an acknowledgement. The AP having transmitted the ACK sends a polling frame to a next STA on the polling list to allow the STA to transmit data. The STA sends an ACK of polling, along with data if having any data to transmit.

Meanwhile, when an error occurs in a frame sent by a polled STA to the AP, the PC re-polls the STA having sent the error frame after an SIFS. When a problem arises in a polling frame sent by the PC to an STA on the polling list or the STA does not receive a polling frame from the AP, the PC re-polls the STA that is a destination for the polling frame with the problem after a PIFS. When a node having received a poll from the PC actually has no data to send, the node sends a null frame to indicate no data to send, and the PC having received the null frame polls a next STA on the polling list.

In a high-density overlapping BSS environment, it is difficult to satisfy QoS required by traffic streams even using a conventional 802.11e EDCA-based traffic differentiation access method. This is because EDCA is basically designed only for differentiation between traffic streams in a BSS but is not designed in view of an overlapping BSS environment. In particular, it is more difficult to satisfy QoS when traffic streams involve a great change in data traffic, such as a video. Therefore, the present specification provides coordination between BSSs for transmission of QoS traffic having a great change in data traffic, such as a video, in a high-density WLAN BSS environment.

The following embodiment of FIGS. 9 to 13 is based on the assumption that six BSSs A1, A2, B1, B2, C1, and C2 overlap. In FIGS. 9 to 13, A1, A2, B1, B2, C1, and C2 may represent that corresponding BSSs transmit a downlink traffic stream in corresponding intervals. In FIGS. 9 to 13, B1 UL and B2 UL may represent that B1 and B2 transmit an uplink traffic stream in corresponding intervals. Further, in FIGS. 9 to 13, a UL may represent that all the six BSSs (A1, A2, B1, B2, C1, and C2) transmit an uplink traffic stream in corresponding intervals. Further, the overlapping BSSs (A1, A2, B1, B2, C1, and C2) share service interval information (the start point and end point of the service interval). The embodiment of FIGS. 9 to 13 is provided merely as one example of transmitting a traffic stream using a CFP and CP in an overlapping BSS, and various embodiments may be possible, without being limited thereto.

Figure 9:
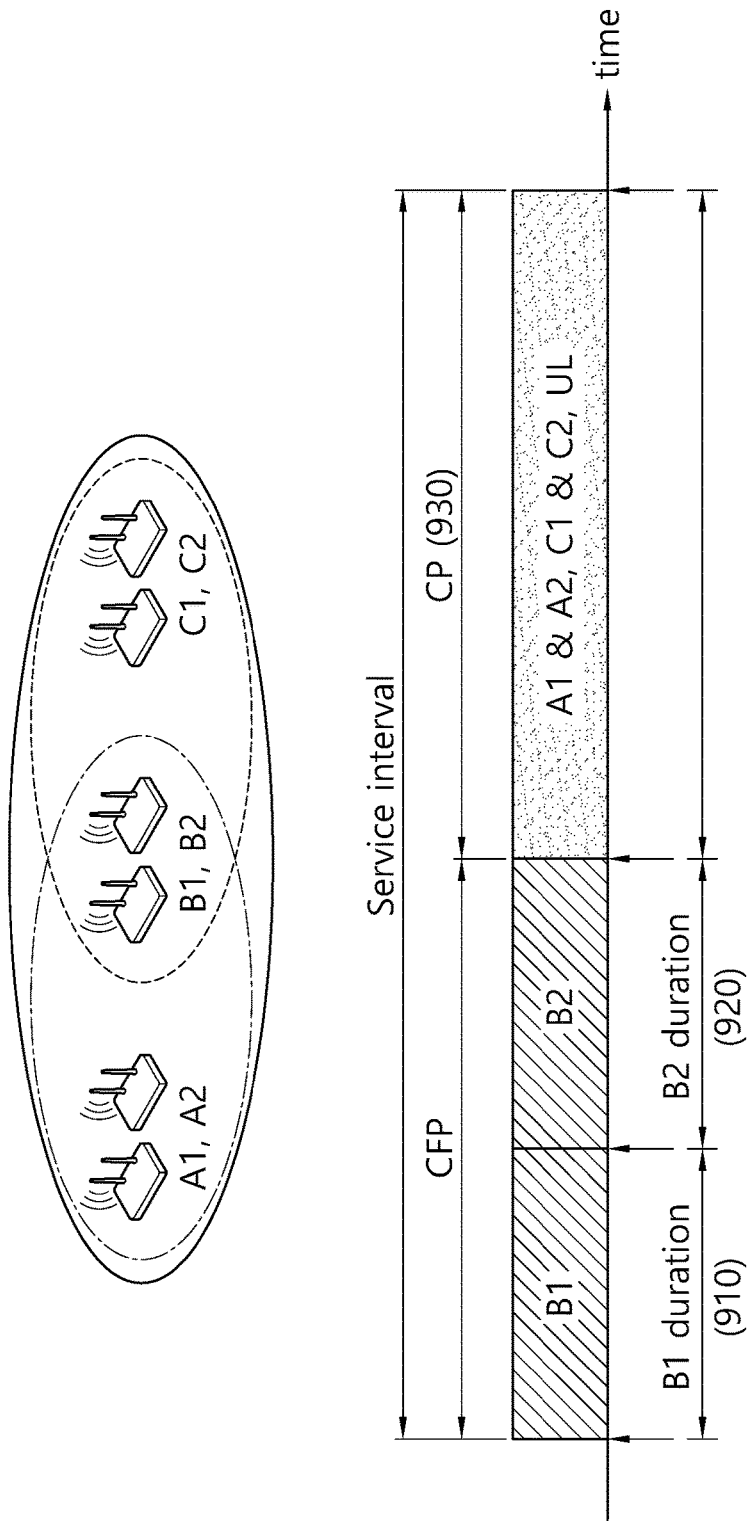
FIG. 9 shows an example of allocating a CFP and a CP in an overlapping BSS environment according to the present embodiment.

FIG. 9 shows an example of allocating a CFP and a CP in an overlapping BSS environment according to the present embodiment.

Referring to FIG. 9, a BSS that transmits a QoS traffic stream determines to allocate a CFP when the traffic stream does not satisfy QoS conditions (throughput, delay, jitter, loss, and the like). The BSS broadcasts allocation information on the CFP through a beacon frame or separate control frame of an AP. Here, the CFP does not overlap with another CFP that is already set by another overlapping BSS. The broadcast allocation information on the CFP includes all or part of the start point and the end point of the CFP, the duration of the CFP, a CFP repetition number, and information on a traffic group to occupy the CFP. The start point and the end point of the CFP may be set to offset values from an absolute time or the start point of the service interval. The information on the traffic group includes information on a BSS allowed to use the CFP for transmission, a transmission direction (uplink or downlink) of a traffic stream, an STA ID, a traffic stream ID, and an access category. If the CFP is set for a downlink traffic stream, broadcasting the information on the traffic group may be omitted. A single BSS may set a plurality of CFPs. When the AP determines to allocate a CFP but there is no or insufficient interval to additionally allocate in the service interval, the AP broadcasts a CFP re-coordination request, which includes information similar to necessary information for CFP allocation. An overlapping BSS that receives information on the CFP re-coordination request may re-coordinate a preset CFP thereof.

The BSS receiving the broadcast coordination information does not transmit a traffic stream thereof in the relevant CFP. To guarantee reception of information broadcast by all APs and STAs in the overlapping BSS, an STA directly receiving information broadcast by another BSS reports the received information to a connected AP. An AP directly or indirectly receiving broadcast information from another BSS reports the information to a connected STA.

Specifically, an AP in B1 transmits a downlink traffic stream to an STA in B1 during B1 duration 910 of a CFP. Further, an AP in B2 transmits a downlink traffic stream to an STA in B2 during B2 duration 920. Here, B1 and B2 do not perform CCA when transmitting the downlink traffic streams during the CFP. APs in A1 and A2 transmit downlink traffic streams to STAs in A1 and A2 during a CP 930. Further, APs in C1 and C2 transmit downlink traffic streams to STAs in C1 and C2 during the CP 930. Here, A1, A2, C1, and C2 perform CCA when transmitting the downlink traffic streams during the CP 930. In addition, APs in all BSSs may transmit uplink traffic streams to STAs in all the BSSs during the CP 930. Here, all the BSSs perform CCA when transmitting the uplink traffic streams during the CP 930.

Figure 10:
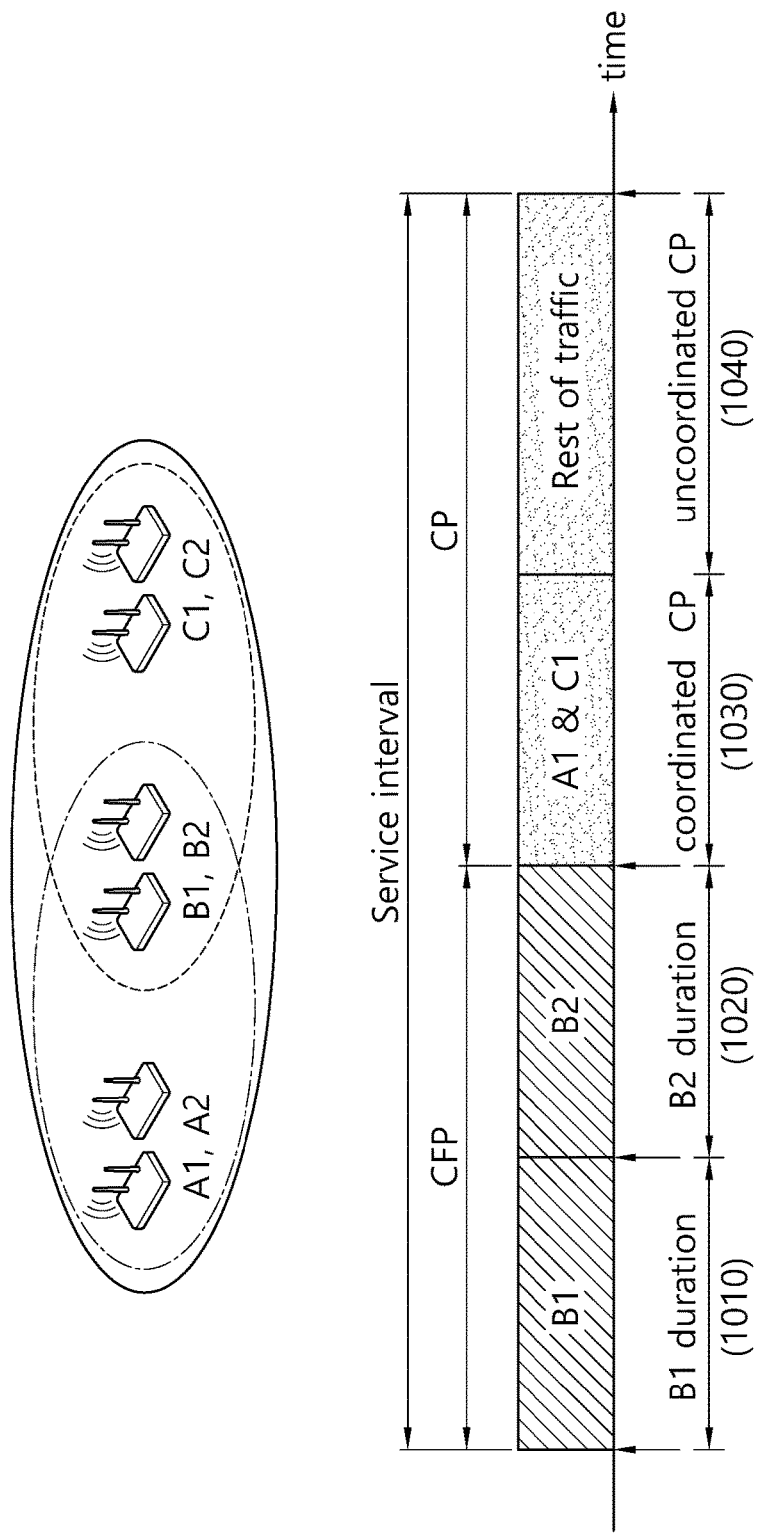
FIG. 10 shows another example of allocating a CFP and a CP in the overlapping BSS environment according to the present embodiment.

FIG. 10 shows another example of allocating a CFP and a CP in the overlapping BSS environment according to the present embodiment.

FIG. 10 illustrates an operation of additionally coordinating a CP between BSSs. Accordingly, overlapping BSSs may adjust the degree of collisions in transmission of traffic streams and an access delay in the CP and may increase the spatial reusability of a channel. To this end, the BSSs additionally broadcast coordination information on a CP. The coordination information on the CP includes all or part of the start point and the end point of the coordinated CP, the duration of the coordinated CP, a coordinated CP repetition number, and information on a traffic group to occupy the coordinated CP. The information on the traffic group to occupy the coordinated CP includes information on a BSS allowed to use the CP for transmission, a transmission direction (uplink or downlink) of a traffic stream, an STA ID, a traffic stream ID, and an access category. To indicate a traffic group criterion of another available overlapping BSS, the broadcast information may additionally include an available access category, a threshold of a traffic level (required throughput, delay, and the like), and an ID of a specific BSS. Further, the broadcast information may include CCA threshold information to be used within the CP to adjust the spatial reusability of the coordinated CP. A plurality of coordinated CPs may be set within a single service interval.

Specifically, an AP in B1 transmits a downlink traffic stream to an STA in B1 during B1 duration 1010 of a CFP. Further, an AP in B2 transmits a downlink traffic stream to an STA in B2 during B2 duration 1020. Here, B1 and B2 do not perform CCA when transmitting the downlink traffic streams during the CFP. APs in A1 and C1 transmit downlink traffic streams to STAs in A1 and C1 during a coordinated CP 1030. Further, remaining traffic streams are transmitted during an uncoordinated CP 1040. Here, the downlink traffic streams in A1 and C1 and the remaining traffic streams are transmitted with performing a CCA.

Figure 11:
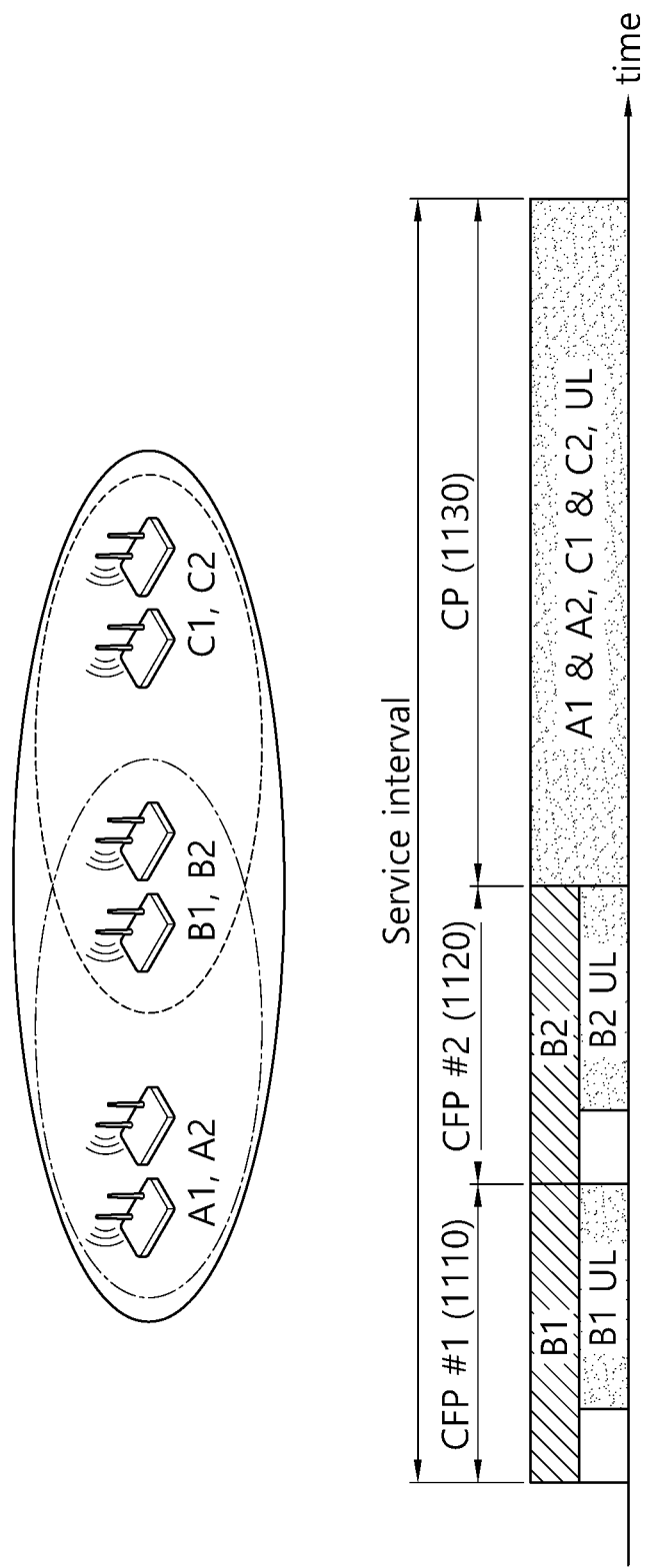
FIG. 11 shows still another example of allocating a CFP and a CP in the overlapping BSS environment according to the present embodiment.

FIG. 11 shows still another example of allocating a CFP and a CP in the overlapping BSS environment according to the present embodiment.

Referring to FIG. 11, when the amount traffic generated from a traffic group allocated a CFP has a great change, an unoccupied interval may occur in the CFP. FIG. 11 shows an operation of allowing another traffic stream to occupy an unoccupied interval when the unoccupied interval occurs in the CFP. To this end, when broadcasting allocation information on the CFP, the allocation information on the CFP includes information on a traffic group that is allowed to occupy the unoccupied interval and channel access parameter information (AIFSN, CWmin, CWmax, and TXOP) to be used for the unoccupied interval. For example, a QoS traffic stream may be set to occupy the CFP without performing CCA (after an SIFS) or after performing one-shot CCA (after a PIFS). Further, another traffic stream in the same BSS may be allowed to occupy the unoccupied interval through EDCA using a set access parameter. Here, the other traffic stream in the same BSS may correspond to B1 UL and B2 UL.

Specifically, an AP in B1 transmits a downlink traffic stream to an STA in B1 during CFP #1 1110. Further, an AP in B2 transmits a downlink traffic stream to an STA in B2 during CFP #2 1120. Here, B1 and B2 do not perform CCA when transmitting the downlink traffic streams during the CFPs 1110 and 1120. In addition, the AP in B1 may receive an uplink traffic stream B1 UL from the STA in B1 during CFP #1 1110. Further, the AP in B2 may receive an uplink traffic stream B2 UL from the STA in B2 during CFP #2 1120. That is, the uplink traffic streams B1 UL and B2 UL may occupy unoccupied intervals that are not used for the downlink traffic streams in the same BSSs (B1 and B2) through EDCA. Here, B1 and B2 perform CCA when receiving the uplink traffic streams during the CFPs 1110 and 1120.

Further, APs in A1 and A2 transmit downlink traffic streams to STAs in A1 and A2 during a CP 1130. Further, APs in C1 and C2 transmit downlink traffic streams to STAs in C1 and C2 during the CP 1130. Here, A1, A2, C1, and C2 perform CCA when transmitting the downlink traffic streams during the CP 1130. In addition, APs in all BSSs may transmit uplink traffic streams to STAs in all the BSSs during the CP 1130. Here, all the BSSs perform CCA when transmitting the uplink traffic streams during the CP 1130.

Figure 12:
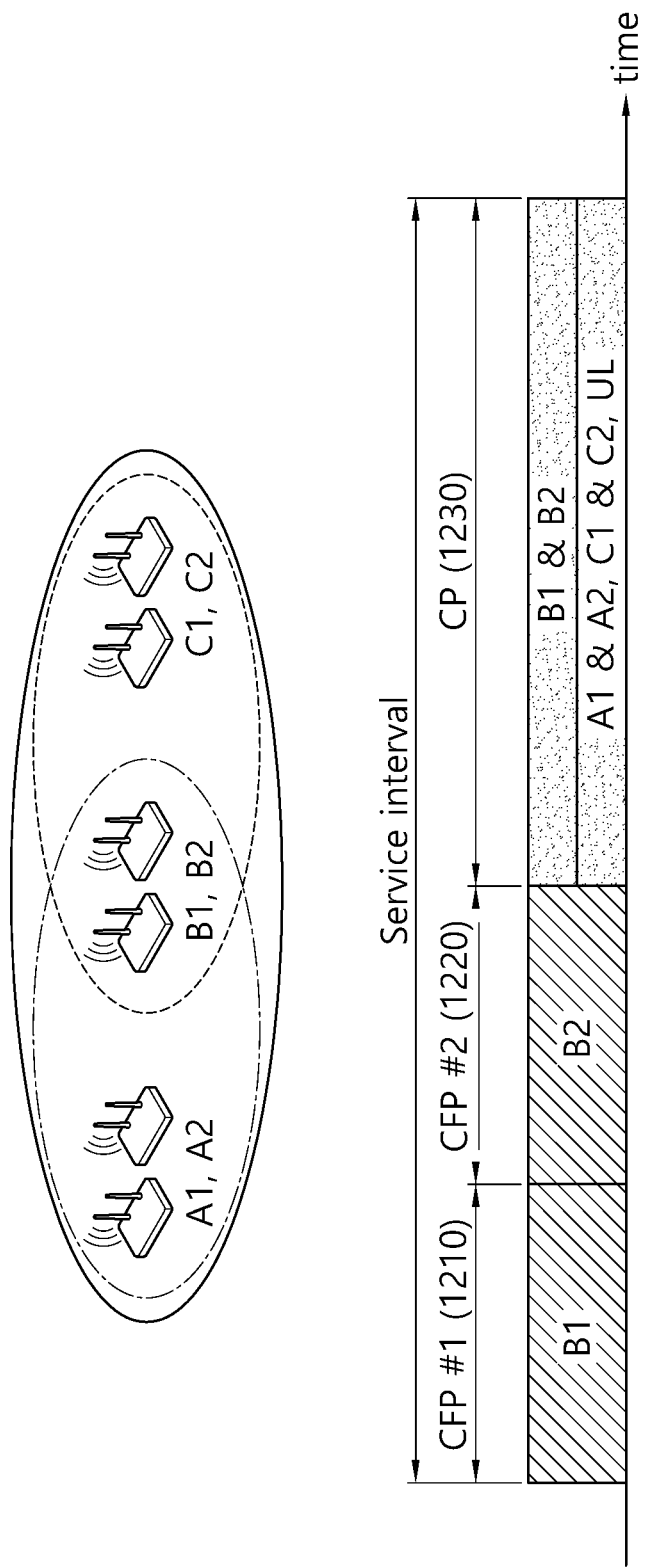
FIG. 12 shows yet another example of allocating a CFP and a CP in the overlapping BSS environment according to the present embodiment.

FIG. 12 shows yet another example of allocating a CFP and a CP in the overlapping BSS environment according to the present embodiment.

Referring to FIG. 12, when the amount traffic generated from a traffic group allocated a CFP has a great change, unlike in FIG. 11, traffic streams allocated for the CFP may not be entirely transmitted within the CFP. Thus, FIG. 12 illustrates an operation of allowing QoS traffic streams, which are not entirely transmitted within the CFP, to be transmitted using a CP. To this end, when broadcasting allocation information on the CFP, the allocation information on the CP includes information on a traffic group that is allowed to occupy the CP and channel access parameter information (AIFSN, CWmin, CWmax, and TXOP) to be used for the CP. For example, a QoS traffic stream may be set to occupy the CFP without performing CCA (after an SIFS) or after performing one-shot CCA (after a PIFS). Further, in using the CP, excessive traffic streams may be allowed to use a lower-ranking EDCA parameter or to use only part of the CP for impartiality with traffic streams in the CP. Further, when broadcasting the allocation information on the CFP, the allocation information on the CFP may include a condition in which a traffic group of the CFP is allowed to use the CP. Further, the allocation information of the CFP may include thresholds of QoS conditions (throughput, delay, jitter, loss, and the like), threshold of buffer conditions (the number of packets in a buffer, data traffic, and the like), and condition satisfaction duration.

Specifically, an AP in B1 transmits a downlink traffic stream to an STA in B1 during CFP #1 1210. Further, an AP in B2 transmits a downlink traffic stream to an STA in B2 during CFP #2 1220. Here, B1 and B2 do not perform CCA when transmitting the downlink traffic streams during the CFPs. In FIG. 12, excessive traffic streams caused by high traffic in the CFP are allowed to occupy the CP. Thus, the AP in B1 may transmit an excessive downlink traffic stream to the STA in B1 during a CP 1230. Further, the AP in B2 may transmit an excessive downlink traffic stream to the STA in B2 during the CP 1230. Here, B1 and B2 perform CCA when receiving the excessive downlink traffic streams during the CP 1230.

Further, APs in A1 and A2 transmit downlink traffic streams to STAs in A1 and A2 during a CP 1230. Further, APs in C1 and C2 transmit downlink traffic streams to STAs in C1 and C2 during the CP 1230. Here, A1, A2, C1, and C2 perform CCA when transmitting the downlink traffic streams during the CP 1230. In addition, APs in all BSSs may transmit uplink traffic streams to STAs in all the BSSs during the CP 1230. Here, all the BSSs perform CCA when transmitting the uplink traffic streams during the CP 1230.

Figure 13:
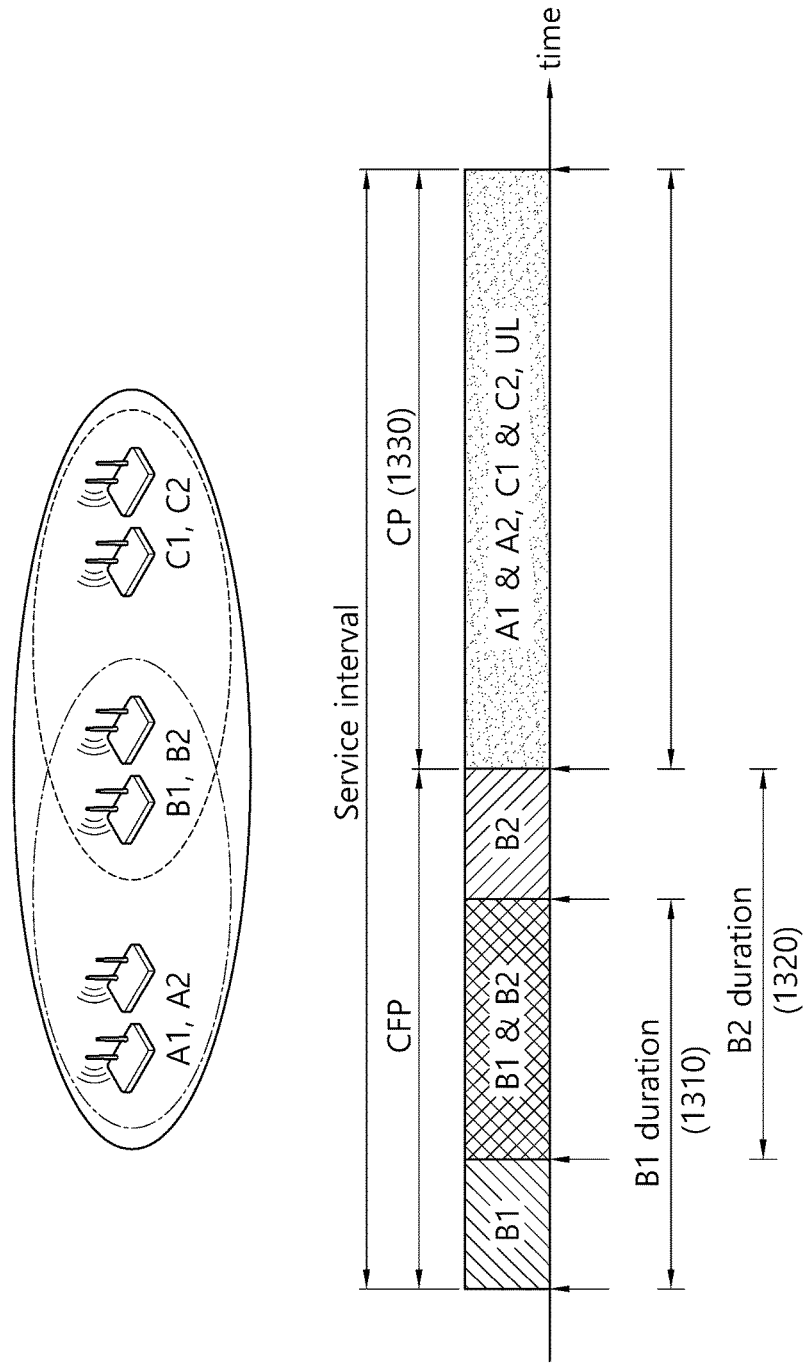
FIG. 13 shows still another example of allocating a CFP and a CP in the overlapping BSS environment according to the present embodiment.

FIG. 13 shows still another example of allocating a CFP and a CP in the overlapping BSS environment according to the present embodiment.

Referring to FIG. 13, when the amount traffic generated from a traffic group allocated a CFP has a great change, all or part of the CFP may be allocated in an overlapping manner. FIG. 13 illustrates that a transmission interval of a traffic stream of B1 and a transmission interval of a traffic stream of B2 overlap during the CFP. When B1 duration 1310 for transmitting the traffic stream of B1 overlap with B2 duration 1320 for transmitting the traffic stream of B2 (when CFPs allocated for two BSSs overlap), if a traffic group of B1 has a great amount of traffic and a traffic group of B2 has a small amount of traffic, the traffic group of B1 uses more CFP. On the contrary, if the traffic group of B1 has a small amount of traffic and the traffic group of B2 has a great amount of traffic, the traffic group of B2 uses more CFP. Accordingly, a traffic group having a less amount of traffic can transmit QoS traffic through a shorter total CFP. If traffic groups of two BSSs all have a great amount of traffic, excessive traffic may be allowed to occupy a CP as in FIG. 12.

When broadcasting allocation information on the CFP, the allocation information on the CFP may include information on a change in traffic of a using traffic group (the highest traffic level, a variance in traffic, and the like), a threshold of a change in traffic of a traffic group to use an overlapping interval, and the maximum length of an overlapping interval. Although allocating a CFP in an overlapping manner, a BSS receiving this information may allocate, in an overlapping manner, a CFP with an allowed length of an overlapping interval only when determining that a QoS level of a traffic stream thereof is guaranteed or satisfying the received threshold of the change.

Specifically, an AP in B1 transmits a downlink traffic stream to an STA in B1 during B1 duration 1310 of the CFP. Further, an AP in B2 transmits a downlink traffic stream to an STA in B2 during B2 duration 1320 of the CFP.

Here, FIG. 13 illustrates that B1 duration 1310, in which the traffic stream of B1 is transmitted in the CFP, overlap with B2 duration 1320, in which the traffic stream of B2 is transmitted in the CFP. Here, suppose that an interval for transmitting only the traffic stream of B1 in the CFP is a first interval, an interval for transmitting the traffic streams of B1 and B2 in an overlapping manner is a second interval, and an interval for transmitting only the traffic stream of B2 is a third interval. More specifically, the AP in B1 transmits the downlink traffic stream to the STA in B1 during the first interval. Here, B1 does not perform CCA when transmitting the downlink traffic stream during the first interval. Further, the APs in B1 and B2 transmit the downlink traffic streams to the STAs in B1 and B2 during the second interval. The second interval is included in the CFP but is an interval in which the traffic streams of B1 and B2 are transmitted in an overlapping manner and thus medium access is performed. Therefore, B1 and B2 perform CCA when transmitting the downlink traffic streams during the second interval. Further, the AP in B2 transmits the downlink traffic stream to the STA in B2 during the third interval. Here, B2 does not perform CCA when transmitting the downlink traffic stream during the third interval.

Further, APs in A1 and A2 transmit downlink traffic streams to STAs in A1 and A2 during a CP 1330. Further, APs in C1 and C2 transmit downlink traffic streams to STAs in C1 and C2 during the CP 1330. Here, A1, A2, C1, and C2 perform CCA when transmitting the downlink traffic streams during the CP 1330. In addition, APs in all BSSs may transmit uplink traffic streams to STAs in all the BSSs during the CP 1330. Here, all the BSSs perform CCA when transmitting the uplink traffic streams during the CP 1330.

Figure 14:
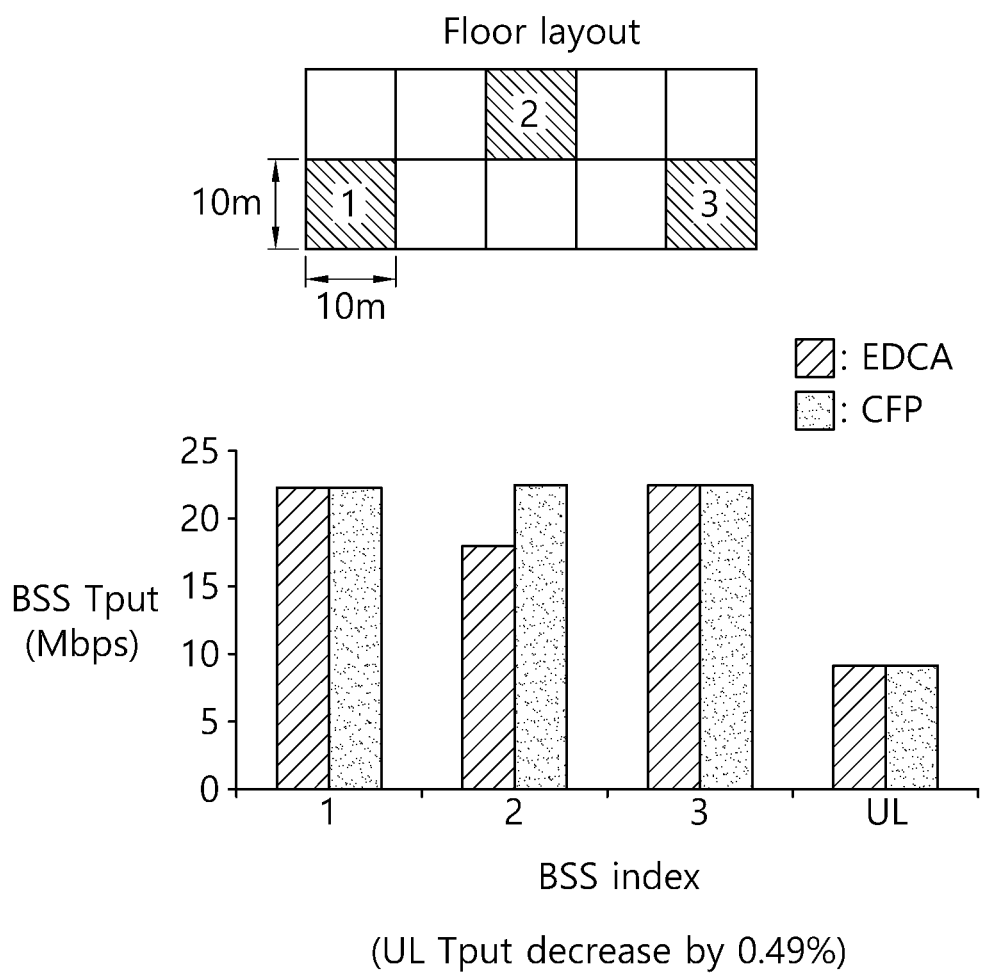
FIG. 14 shows a performance result value according to a method of allocating a CFP and a CP of the present embodiment.

FIG. 14 shows a performance result value according to a method of allocating a CFP and a CP of the present embodiment.

FIG. 14 shows a performance result value acquired by the foregoing method in view of BSS topology and CFP configuration. The BSS topology and CFP configuration may be shown in a floor layout of a building. FIG. 14 illustrates BSS indexes of 1 to 3.

A CFP offset and CFP duration for a BSS are listed below in Table 1.

TABLE 1

| BSS index | CFP reservation | |
|---|---|---|
| | CFP offset (ms) | CFP duration (ms) |
| 1, 3 | 50 | 50 |
| 2 | 0 | 50 |

Results of comparing a BSS with a BSS index of 2 transmitting a traffic stream through EDCA and that transmitting a traffic stream using a CFP are listed in Table 2.

TABLE 2

| (BSS #2) | EDCA | CFP | Gain |
|---|---|---|---|
| PSNR | 32.9 dB | 47.8 dB | +14.9 dB |
| Delay of video packets | 198 ms | 108 ms | −45.5% |
| Packet drops due to latency | 32.8% | 0.3% | −99.1% |

Figure 15:
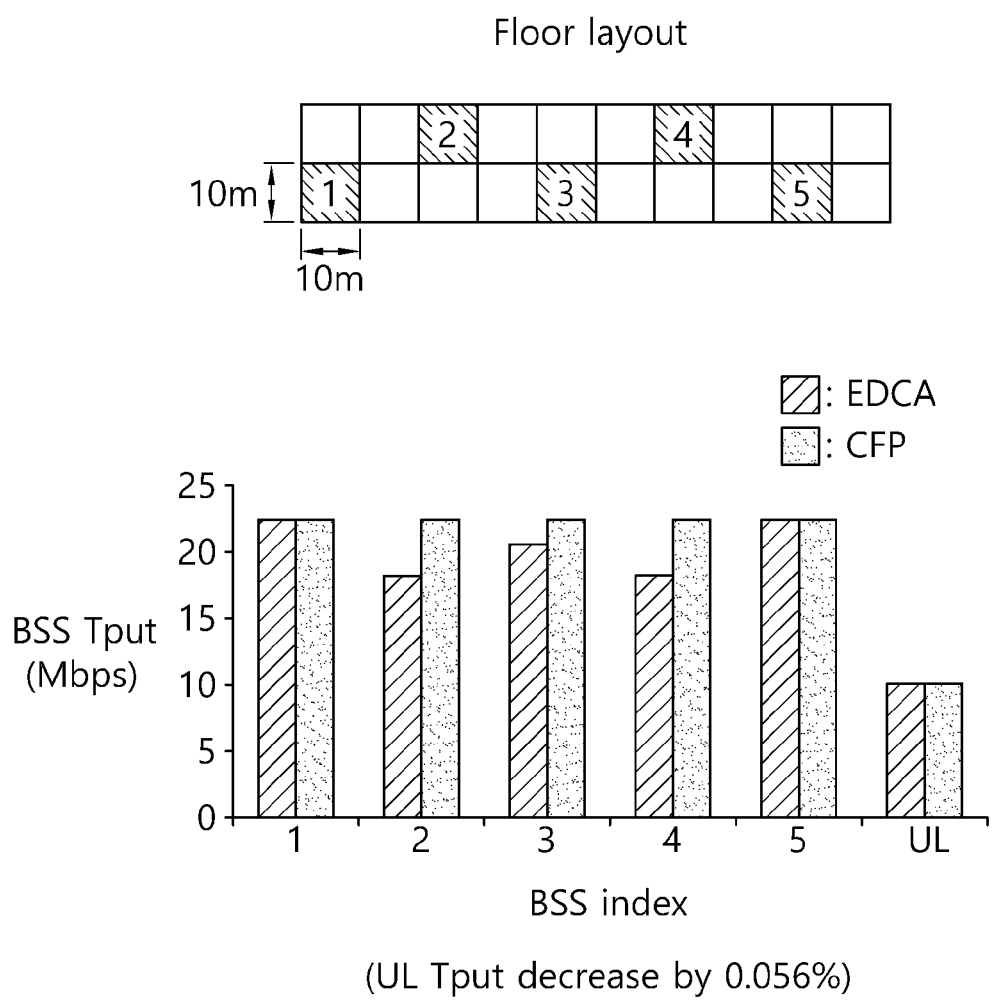
FIG. 15 shows a performance result value according to a method of allocating a CFP and a CP of the present embodiment.

FIG. 15 shows a performance result value according to a method of allocating a CFP and a CP of the present embodiment.

FIG. 15 shows a performance result value acquired by the foregoing method in view of BSS topology and CFP configuration. The BSS topology and CFP configuration may be shown in a floor layout of a building. FIG. 15 illustrates BSS indexes of 1 to 5.

A CFP offset and CFP duration for a BSS are listed below in Table 3.

TABLE 3

| BSS index | CFP reservation | |
|---|---|---|
| | CFP offset (ms) | CFP duration (ms) |
| 1, 3, 5 | 50 | 50 |
| 2, 4 | 0 | 50 |

Results of comparing a BSS with a BSS index of 2 transmitting a traffic stream through EDCA and that transmitting a traffic stream using a CFP are listed in Table 4.

TABLE 4

| (BSS #2) | EDCA | CFP | Gain |
|---|---|---|---|
| PSNR | 32.0 dB | 47.7 dB | +15.7 dB |
| Delay of video packets | 193 ms | 113 ms | −41.3% |

TABLE 4-continued

| (BSS #2) | EDCA | CFP | Gain |
|---|---|---|---|
| Packet drops due to latency | 31.1% | 0.3% | −99.1% |

Figure 16:
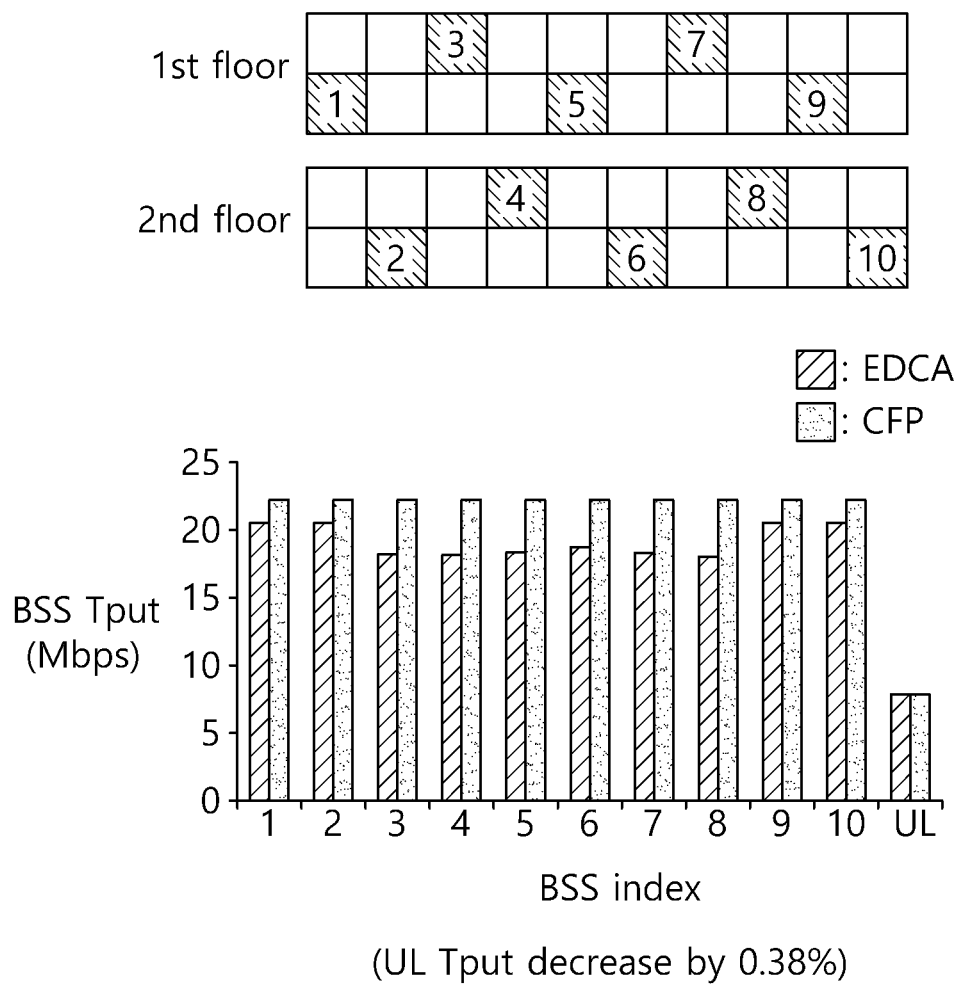
FIG. 16 shows a performance result value according to a method of allocating a CFP and a CP of the present embodiment.

FIG. 16 shows a performance result value according to a method of allocating a CFP and a CP of the present embodiment.

FIG. 16 shows a performance result value acquired by the foregoing method in view of BSS topology and CFP configuration. The BSS topology and CFP configuration may be shown in a floor layout of a building. FIG. 16 illustrates BSS indexes of 1 to 10.

A CFP offset and CFP duration for a BSS are listed below in Table 5.

TABLE 5

| BSS index | CFP reservation | |
|---|---|---|
| | CFP offset (ms) | CFP duration (ms) |
| 1, 4, 5, 8, 9 | 50 | 50 |
| 2, 3, 6, 7, 10 | 0 | 50 |

Results of comparing a BSS with a BSS index of 7 transmitting a traffic stream through EDCA and that transmitting a traffic stream using a CFP are listed in Table 6.

TABLE 6

| (BSS #7) | EDCA | CFP | Gain |
|---|---|---|---|
| PSNR | 31.7 dB | 47.3 dB | +15.6 dB |
| Delay of video packets | 209 ms | 130 ms | −37.7% |
| Packet drops due to latency | 33.7% | 0.4% | −98.9% |

Results of comparing a BSS with a BSS index of 8 transmitting a traffic stream through EDCA and that transmitting a traffic stream using a CFP are listed in Table 7.

TABLE 7

| (BSS #8) | EDCA | CFP | Gain |
|---|---|---|---|
| PSNR | 30.2 dB | 47.4 dB | +17.2 dB |
| Delay of video packets | 210 ms | 125 ms | −40.6% |
| Packet drops due to latency | 35.3% | 0.4% | −98.9% |

Figure 17:
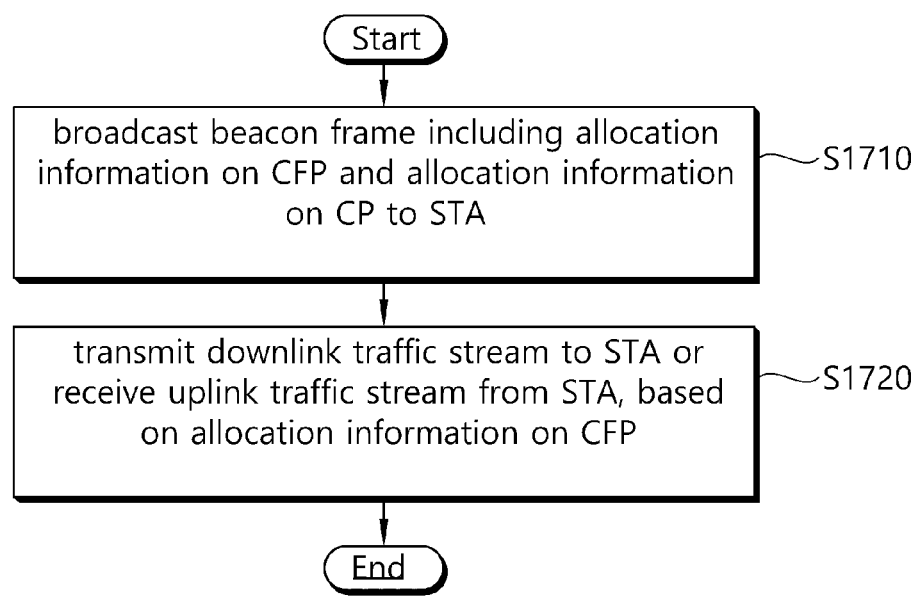
FIG. 17 is a flowchart illustrating a procedure for transmitting and receiving a traffic stream in an overlapping BSS environment according to the present embodiment.

FIG. 17 is a flowchart illustrating a procedure for transmitting and receiving a traffic stream in an overlapping BSS environment according to the present embodiment.

First, defining terms, a contention-free period may be represented by a CFP, and a contention period may be represented by a CP. Further, an overlapping OBSS environment may correspond to an environment in which a first BSS overlaps with a second BSS. An AP and a STA may be included in the second BSS. That is, the following description is made on operations of the AP and the STA that are included in the second BSS. The first BSS and the second BSS share a service interval including a CFP and a CP. A traffic stream may correspond to a QoS traffic stream.

In operation S1710, the AP broadcasts a beacon frame including allocation information on a CFP and allocation information on a CP to an STA.

In operation S1720, based on the allocation information on the CFP, the AP transmits a downlink traffic stream to the STA or receives an uplink traffic stream from the STA.

For example, the allocation information on the CFP indicates that the downlink traffic stream is transmitted without performing a CCA during the CFP. Further, the allocation information on the CFP indicates that the uplink traffic stream is received with performing a CCA during the CFP, which may correspond to the example of FIG. 11. That is, the allocation information on the CFP shows that when an unoccupied interval occurs in the CFP, the uplink traffic stream occupies the unoccupied interval period which is not occupied by the downlink traffic stream in the CFP. To this end, the allocation information on the CFP includes information on a traffic group that is allowed to occupy the unoccupied interval of the CFP and an access parameter (AIFSN, CWmin, CWmax, and TXOP) to be used for the unoccupied interval of the CFP. Here, the uplink traffic stream is received in the unoccupied interval of the CFP using the access parameter information. Since the uplink traffic stream occupies the unoccupied interval of the CFP based on EDCA, CCA is involved even in the CFP.

For example, the allocation information on the CP indicates that a downlink traffic stream is transmitted with performing a CCA during the CP. The AP transmits the downlink traffic stream to the STA based on the allocation information on the CP, which may correspond to the example of FIG. 12. That is, the allocation information on the CP shows that when there is too much downlink traffic and thus all downlink traffic streams are not transmitted within the CFP, excessive downlink traffic streams are transmitted even in the CP. To this end, the allocation information on the CP includes information on a traffic group that is allowed to occupy the CP and an access parameter (AIFSN, CWmin, CWmax, and TXOP) to be used for the CP. Here, the excessive downlink traffic streams are transmitted during the CP using the access parameter information. Since the excessive downlink traffic streams occupy the CP using a lower-ranking EDCA parameter for impartiality with traffic in the CP, CCA is involved.

For another example, when the CFP includes a first interval and a second interval, the allocation information on the CFP indicates that the downlink traffic stream is transmitted without performing a CCA during the first interval. Further, when the CFP includes the first interval and the second interval, the allocation information on the CFP indicates that the downlink traffic stream is transmitted with performing a CCA during the second interval, which may correspond to the example of FIG. 13. That is, the allocation information on the CFP shows an operation of transmitting a downlink traffic stream when transmission intervals of a traffic stream of the first BSS and a traffic stream of the second BSS overlap during the CFP.

Since the AP and the STA are included in the second BSS, the first interval may correspond to an interval in which only the second BSS transmits a traffic stream in the CFP, and the second interval may correspond to an interval in which the first BSS and the second BSS transmit traffic streams in an overlapping manner within the CFP. Thus, the AP transmits the downlink traffic stream to the STA during the first interval. Here, since the first interval is occupied only by the second BSS, the AP does not perform CCA when transmitting the downlink traffic stream in the first interval. Further, the AP transmits the downlink traffic stream to the STA during the second interval. Here, since the second interval is occupied by the first BSS and the second BSS in an overlapping manner, the AP performs CCS when transmitting the downlink stream in the second interval. That is, since the second interval is a period in which the first BSS and the second BSS transmit traffic streams in an overlapping manner, medium access is performed.

The allocation information on the CFP includes at least one of the start point and the end point of the CFP, the duration of the CFP, a CFP repetition number, and information on a traffic group to occupy the CFP. The start point and the end point of the CFP are set to offset values from the start point of a service interval. The information on the traffic group to occupy the CFP may include at least one of information on the second BSS, a transmission direction (uplink or downlink) of a traffic stream, an STA identification (ID), a traffic stream ID, and an access category.

The allocation information on the CP includes at least one of the start point and the end point of the CP, the duration of the CP, a CP repetition number, and information on a traffic group to occupy the CP. The start point and the end point of the CP are set to offset values from the start point of a service interval. The information on the traffic group to occupy the CP may include at least one of information on the second BSS, a transmission direction (uplink or downlink) of a traffic stream, an STA ID, a traffic stream ID, and an access category.

Figure 18:
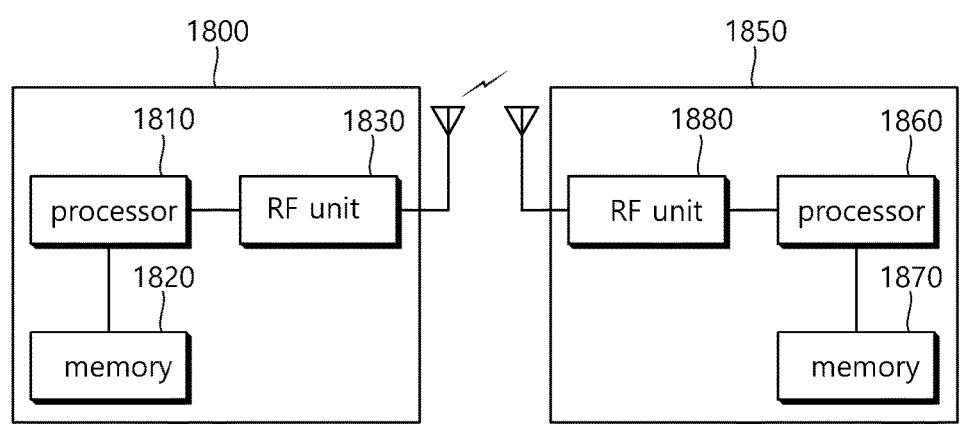
FIG. 18 is a block diagram illustrating a wireless apparatus to which an embodiment of the present invention can be applied.

FIG. 18 is a block diagram illustrating a wireless apparatus to which an embodiment can be applied.

Referring to FIG. 18, the wireless apparatus as an STA capable of implementing the aforementioned embodiment may be an AP 1800 or a non-AP station. The wireless apparatus may correspond to the user or a transmitting apparatus which transmits a signal to the user.

The AP 1800 may include a processor 1810, a memory 1820, and a radio frequency (RF) unit 1830.

The RF unit 1830 is connected with the processor 1810 to transmit/receive a radio signal.

The processor 1810 implements a function, a process, and/or a method which are proposed in the present invention. For example, the processor 1810 may perform the operation of according to the embodiment. That is, the processor 1810 may perform the operation which may be performed by the AP among the operations disclosed in the embodiment of FIGS. 1 to 17.

The non-AP STA 1850 may include a processor 1860, a memory 1870, and a radio frequency (RF) unit 1880.

The RF unit 1880 is connected with the processor 1860 to transmit/receive the radio signal.

The processor 1860 may implement a function, a process, and/or a method which are proposed in the present invention. For example, the processor 1860 may be implemented to perform a non-AP STA operation according to the embodiment. The processor may perform the operation of the non-AP STA in the embodiment of FIGS. 1 to 17.

The processors 1810 and 1860 may include an application-specific integrated circuit (ASIC), other chipset, a logic circuit, a data processing device, and/or a converter that converts a baseband signal and the radio signal to each other. The memories 1820 and 1870 may include a read-only memory (ROM), a random access memory (RAM), a flash memory, a memory card, a storage medium, and/or other storage devices. The RF units 1830 and 1880 may include one or more antennas that transmit and/or receive the radio signal.

When the embodiment is implemented by software, the aforementioned technique may be implemented by a module (a process, a function, and the like) that performs the aforementioned function. The module may be stored in the memories 1820 and 1870 and executed by the processors 1810 and 1860. The memories 1820 and 1870 may be positioned inside or outside the processors 1810 and 1860 and connected with the processors 1810 and 1860 through various well-known means.

What is claimed is:

1. A method of transmitting and receiving a traffic stream by an access point (AP) in a wireless local area network (WLAN) system, the method comprising:
   broadcasting a beacon frame comprising allocation information on a contention-free period (CFP) and allocation information on a contention period (CP) to a station (STA); and
   transmitting a downlink traffic stream to the STA or receiving an uplink traffic stream from the STA, based on the allocation information on the CFP,
   wherein the allocation information on the CFP indicates that the downlink traffic stream is transmitted without performing a clear channel assessment (CCA) during the CFP and indicates that the uplink traffic stream is received with performing a CCA during the CFP.

2. The method of claim 1, further comprising:
   transmitting the downlink traffic stream to the STA based on the allocation information on the CP
   wherein the allocation information on the CP indicates that the downlink traffic stream is transmitted with performing a CCA during the CP.

3. The method of claim 1, wherein the AP and the STA are comprised in a second basic service set (BSS) overlapping with a first BSS, and the first BSS and the second BSS use a service interval comprising the CFP and the CP.

4. The method of claim 3, wherein when the CFP comprises a first interval occupied by the first BSS and a second interval occupied by the first BSS and the second BSS in an overlapping manner, the allocation information on the CFP indicates that the downlink traffic stream is transmitted without performing a CCA during the first interval and that the downlink traffic stream is transmitted with performing a CCA during the second interval.

5. The method of claim 3, wherein the allocation information on the CFP comprises at least one of a start point and an end point of the CFP, duration of the CFP, a CFP repetition number, and information on a traffic group to occupy the CFP,
   the start point and the end point of the CFP are set to offset values from a start point of the service interval, and
   the information on the traffic group to occupy the CFP comprises at least one of information on the second BSS, a transmission direction of a traffic stream, an STA identification (ID), a traffic stream ID, and an access category.

6. The method of claim 3, wherein the allocation information on the CP comprises at least one of a start point and an end point of the CP, duration of the CP, a CP repetition number, and information on a traffic group to occupy the CP,
   the start point and the end point of the CP are set to offset values from a start point of the service interval, and
   the information on the traffic group to occupy the CP comprises at least one of information on the second BSS, a transmission direction of a traffic stream, an STA identification (ID), a traffic stream ID, and an access category.

7. The method of claim 1, wherein the allocation information on the CFP further comprises information on a traffic group to occupy an unoccupied interval of the CFP and access parameter information to be used for the unoccupied interval of the CFP, and the uplink traffic stream is received in the unoccupied interval of the CFP using the access parameter information.

8. A wireless device for transmitting and receiving a traffic stream in a wireless local area network (WLAN) system, the wireless device comprising:
a radio frequency (RF) unit to transmit and receive a radio signal; and
a processor operatively connected to the RF unit,
wherein the processor broadcasts a beacon frame comprising allocation information on a contention-free period (CFP) and allocation information on a contention period (CP) to a station (STA) and transmits a downlink traffic stream to the STA or receiving an uplink traffic stream from the STA, based on the allocation information on the CFP, and
the allocation information on the CFP indicates that the downlink traffic stream is transmitted without performing a clear channel assessment (CCA) during the CFP and indicates that the uplink traffic stream is received with performing a CCA during the CFP.

9. The wireless device of claim 8, wherein the processor transmits the downlink traffic stream to the STA based on the allocation information on the CP, and the allocation information on the CP indicates that the downlink traffic stream is transmitted with performing a CCA during the CP.

10. The wireless device of claim 8, wherein the AP and the STA are comprised in a second basic service set (BSS) overlapping with a first BSS, and the first BSS and the second BSS use a service interval comprising the CFP and the CP.

11. The wireless device of claim 10, wherein when the CFP comprises a first interval occupied by the first BSS and a second interval occupied by the first BSS and the second BSS in an overlapping manner, the allocation information on the CFP indicates that the downlink traffic stream is transmitted without performing a CCA during the first interval and that the downlink traffic stream is transmitted with performing a CCA during the second interval.

12. The wireless device of claim 10, wherein the allocation information on the CFP comprises at least one of a start point and an end point of the CFP, duration of the CFP, a CFP repetition number, and information on a traffic group to occupy the CFP,
the start point and the end point of the CFP are set to offset values from a start point of the service interval, and
the information on the traffic group to occupy the CFP comprises at least one of information on the second BSS, a transmission direction of a traffic stream, an STA identification (ID), a traffic stream ID, and an access category.

13. The wireless device of claim 10, wherein the allocation information on the CP comprises at least one of a start point and an end point of the CP, duration of the CP, a CP repetition number, and information on a traffic group to occupy the CP,
the start point and the end point of the CP are set to offset values from a start point of the service interval, and
the information on the traffic group to occupy the CP comprises at least one of information on the second BSS, a transmission direction of a traffic stream, an STA identification (ID), a traffic stream ID, and an access category.

14. The wireless device of claim 8, wherein the allocation information on the CFP further comprises information on a traffic group to occupy an unoccupied interval of the CFP and access parameter information to be used for the unoccupied interval of the CFP, and the uplink traffic stream is received in the unoccupied interval of the CFP using the access parameter information.

* * * * *